US007286805B2

(12) United States Patent
Stampfl

(10) Patent No.: US 7,286,805 B2
(45) Date of Patent: Oct. 23, 2007

(54) ARRANGEMENT AND METHOD FOR THE CHANNEL-SELECTIVE RECEPTION OF A SIGNAL TAKING ACCOUNT OF A TIME-DEPENDENT OCCURRENCE OF A FINAL RANGE OF A SIGNAL SECTION OF THE SIGNAL

(75) Inventor: Norbert Stampfl, Grossweikersdorf (AT)

(73) Assignee: Koninklijke Philips Electronics, N.V., Eindhoven (NL)

( * ) Notice: Subject to any disclaimer, the term of this patent is extended or adjusted under 35 U.S.C. 154(b) by 173 days.

(21) Appl. No.: 10/543,393

(22) PCT Filed: Jan. 26, 2004

(86) PCT No.: PCT/IB2004/050051

§ 371 (c)(1), (2), (4) Date: Jul. 26, 2005

(87) PCT Pub. No.: WO2004/068753

PCT Pub. Date: Aug. 12, 2004

(65) Prior Publication Data

US 2006/0089162 A1 Apr. 27, 2006

(30) Foreign Application Priority Data

Jan. 31, 2003 (EP) ................................. 03100201

(51) Int. Cl.
*H04B 1/00* (2006.01)

(52) U.S. Cl. .................................. 455/185.1; 455/3.02

(58) Field of Classification Search ................ 455/566, 455/3.02; 370/468; 379/101.1
See application file for complete search history.

(56) References Cited

U.S. PATENT DOCUMENTS

2003/0163823 A1 * 8/2003 Logan et al. ................. 725/89

FOREIGN PATENT DOCUMENTS

JP 09121339 A 5/1997

* cited by examiner

*Primary Examiner*—Nick Corsaro
*Assistant Examiner*—Shannon R. Brooks

(57) ABSTRACT

In an arrangement (1) for processing a signal (S) which has successive signal sections (SP), wherein each signal section (SP) comprises a useful information item (UI) and an additional information item (AI) and wherein a time-dependent occurrence of a final range (EA) of a signal section (SP) can be determined with the aid of the additional information item (AI) of this signal section (SP), there are provided channel selection means (6) which can be used to temporally successively select at least two channels (C1, C2, C3) and, using the additional information item (AI) in accordance with the selected channel (C1, C2, C3), to determine the time-dependent occurrence of the respective final range (EA), and, following the determination of the time-dependent occurrence of the respective final ranges (EA) of the signal sections (SP) in at least two channels (C1, C2, C3), to select that channel (C1, C2, C3) in which the signal section (SP) with the temporally next final range (EA) occurs.

12 Claims, 3 Drawing Sheets

| | CN | T |
|---|---|---|
| L1 | CD3 | CV3 |
| L2 | CD1 | CV1 |
| L3 | CD2 | CV2 |

ARRANGEMENT AND METHOD FOR THE CHANNEL-SELECTIVE RECEPTION OF A SIGNAL TAKING ACCOUNT OF A TIME-DEPENDENT OCCURRENCE OF A FINAL RANGE OF A SIGNAL SECTION OF THE SIGNAL

The invention relates to an arrangement for processing a signal which has successive signal sections, wherein each signal section comprises a useful information item and an additional information item and wherein a time-dependent occurrence of a final range of a signal section can be determined with the aid of the additional information item of this signal section.

The invention furthermore relates to a channel selection method for selecting a channel, via which channel a signal which has successive signal sections can be received, wherein each signal section comprises a useful information item and an additional information item and wherein a time-dependent occurrence of a final range of a signal section can be determined with the aid of the additional information item of this signal section.

An arrangement of the type mentioned in the first paragraph, by means of which the method of the type mentioned in the second paragraph can be carried out, is commercially available from the Applicant under the name "Streamium" with the type designation MC-i200, and is therefore known.

The known arrangement is what is referred to as an Internet radio device, which can be used to receive a signal in the form of a real-time data stream via the Internet. A signal of this type is sent out in each case via one channel from a large number of transmitting stations, so that the respective signal can be received simultaneously by a number of known arrangements. The signal has signal sections, wherein each signal section has a useful information item—specifically, for example, a piece of music—and an additional information item—specifically what are referred to as metadata. The metadata are provided for characterizing the individual signal sections with regard to their content and with regard to their time-dependent transmission status, wherein the transmission status indicates for example a signal section duration that has already elapsed or a remaining signal section duration and/or an entire signal section duration. The arrangement has receiving means which are designed for the channel-selective reception of the signal taking account of a channel selection information item which can be set by a user of the arrangement. Furthermore, the arrangement has additional information item extraction means which are designed to extract the additional information item from the respective signal section of the received signal. The known arrangement is furthermore designed to visually display the extracted additional information item, in order to inform the user about the content and the transmission status, and to acoustically deliver the useful information item.

In the known arrangement, there is the problem that a search of the channels for pieces of music whose transmission status indicates that it is approaching its final range in terms of time, in order not to miss a start of a temporally successive new piece of music, can only be carried out manually by a user and also only in an extremely laborious manner and with a relatively low hit rate because, on the one hand, the final range of a piece of music can be found with a high degree of probability only very rarely in the case of manual selection of the channels and because, on the other hand, when one remains in a channel in order not to miss a start of the next piece of music in this channel there is the risk that an earlier start of a piece of music available in another channel will necessarily be missed.

It is an object of the invention to overcome the abovementioned problems with an arrangement of the type mentioned in the first paragraph and with a method of the type mentioned in the second paragraph, and to provide an improved arrangement and an improved method.

To achieve the abovementioned object, an arrangement according to the invention is provided with features according to the invention, so that an arrangement according to the invention can be characterized in the manner indicated below, namely:

Arrangement for processing a signal which has successive signal sections, wherein each signal section comprises a useful information item and an additional information item and wherein a time-dependent occurrence of a final range of a signal section can be determined with the aid of the additional information item of this signal section, which arrangement has receiving means which are designed for the channel-selective reception of the signal via the respectively selected channel, taking account of a channel selection information item which can be fed to it, and for the delivery of the received signal, and which arrangement has additional information item extraction means which are designed to extract the additional information item from the received signal of the respectively selected channel and to deliver the respectively extracted additional information item, and which arrangement has channel selection means which are designed a) to generate at least two channel selection information items for the selection of at least two channels, and b) to temporally successively deliver the at least two channel selection information items to the receiving means, and c) to receive the additional information item respectively extracted and delivered by means of the additional information item extraction means in accordance with the respectively selected channel, and d) using the additional information item respectively received in accordance with the respectively selected channel, to determine the time-dependent occurrence of the respective final range, and e) following the determination of the time-dependent occurrence of the respective final ranges of the signal sections in at least two channels, to generate and deliver that channel selection information item which can be used to select that channel in which the signal section with the temporally next final range occurs.

To achieve the abovementioned object, a channel selection method according to the invention is provided with features according to the invention, so that a channel selection method according to the invention can be characterized in the manner indicated below, namely:

Channel selection method for selecting a channel, via which channel a signal which has successive signal sections can be received, wherein each signal section comprises a useful information item and an additional information item and wherein a time-dependent occurrence of a final range of a signal section can be determined with the aid of the additional information item of this signal section, wherein the signal is received in a channel-selective manner via the respectively selected channel with the aid of receiving means, taking account of a channel selection information item which can be fed to them, and the received signal is delivered by the receiving means, and wherein the additional information item is extracted from the received signal of the respectively selected channel with the aid of additional information item extraction means and is delivered by the additional information item extraction means, and wherein channel selection means are used a) to generate at least two channel selection information items for the selection of at least two channels, and b) to temporally successively deliver the at least two channel selection information items to the receiving means, and c) to receive the additional information item respectively extracted and delivered by means of the additional information item extraction means in accordance with the respectively selected channel, and d) using the additional information item respectively received in accordance with the respectively selected channel, to determine the time-dependent occurrence of the respective final range, and e) following the determination of the time-dependent occurrence of the respective final ranges of the signal sections in at least two channels, to generate and deliver that channel selection information item which can be used to select that channel in which the signal section with the temporally next final range occurs.

By providing the measures according to the invention, the advantage is obtained that, without any manual intervention by a user of the arrangement, the arrangement automatically precisely selects that channel in which a signal section, such as a piece of music or a video film for example, newly begins at the earliest possible point in time. This ensures that a user searching for a specific piece of music or a specific video film has the opportunity at any time to follow this newly beginning piece of music or this newly beginning video film in full if the content of the piece of music or of the video film corresponds to what he wants. This also ensures that a user has the opportunity at any time, from the start of the piece of music or of the video film, to check the content found by the additional information item in order to ascertain whether the content corresponds to what he wants. As a result, the advantage is furthermore obtained that a piece of music or a video film that is newly beginning in a channel that is not selected at that moment in time cannot be missed by a user.

A solution according to the invention may be characterized for example in that the channel in which the temporally next final range occurs is selected so long before the final range that a transition between adjacent signal sections can be considerably perceived by a user of the arrangement. Furthermore, it may be characterized in that the relevant channel is selected so long after the final range that the signal section occurring after the final range is available to the user only once the useful information item of the new signal section following the final range has a meaningful content, as is the case for example after a start leader or an advertisement played in at the start of the new signal section or after a fade-over phase between the two temporally adjacent signal sections. However, it has proven to be particularly advantageous when the features as claimed in claim 2 and claim 8 are additionally provided. As a result, the advantage is obtained that the content of the signal section following the preceding signal section in a channel, which content is available by means of the additional information item, is available as early as possible, and specifically even when the content of the useful information item of the signal section following the preceding signal section cannot yet be seen by a user, because in the time domain around the final range of the preceding signal section the useful information item of this signal section is faded out and at the same time the useful information item of the following signal section is faded in, as is customary for example in the case of a fade-over of two temporally adjacent pieces of music, since in the case of such a fade-over both signal sections are temporarily available at the same time during the final range of the preceding signal section.

A solution according to the invention may be characterized in that the additional information item represents an entire signal section duration and an already elapsed signal section duration or an elapsed percentage of the entire signal section duration, and in that the channel selection means are designed to process this additional information item. Furthermore, a solution according to the invention may be characterized in that the additional information item delivers only the entire signal section duration of the signal section available at a respective moment in time, and in that the channel selection means are designed to determine the final range of the signal section while knowing the start time of the signal section present at that moment in time and taking account of the entire signal section duration of the respective signal section. However, it has proven to be particularly advantageous when the features as claimed in claim 3 and claim 9 are additionally provided. As a result, the advantage is obtained that the final range of the signal section present at that moment in time in the selected channel can be determined without complicated calculations and without any signal transmission problems, such as problems of transmission delays on the respective channel for example, having to be taken into account.

It has also proven to be advantageous in the case of a solution according to the invention when the features as claimed in claim 4 and claim 10 are additionally provided. As a result, the advantage is obtained that the parameters for a large number of channels can be logged and used at any point in time.

It has also proven to be advantageous in the case of a solution according to the invention when the features as claimed in claim 5 and claim 11 are additionally provided. As a result, the advantage is obtained that an allocation between parameters and channel data information items is obtained that is as flexible as possible, and that the available storage space can be used in an optimized manner with regard to the actual number of selected channels because no predefined storage occupancy is required.

It has also proven to be advantageous in the case of a solution according to the invention when the features as claimed in claim 6 and claim 12 are additionally provided. As a result, the advantage is obtained that, in addition to the selection, at a suitable point in time, of a channel in which a new signal section is beginning, a check is automatically made as to whether the content of this newly beginning signal section corresponds to what a user of the arrangement wants, and that in this case the channel is made permanently available to the user.

The abovementioned aspects and further aspects of the invention emerge from the example of an embodiment described below and are explained with reference to this example of an embodiment.

The invention will be further described with reference to an example of an embodiment shown in the drawings to which, however, the invention is not restricted.

Figures 1, 2:
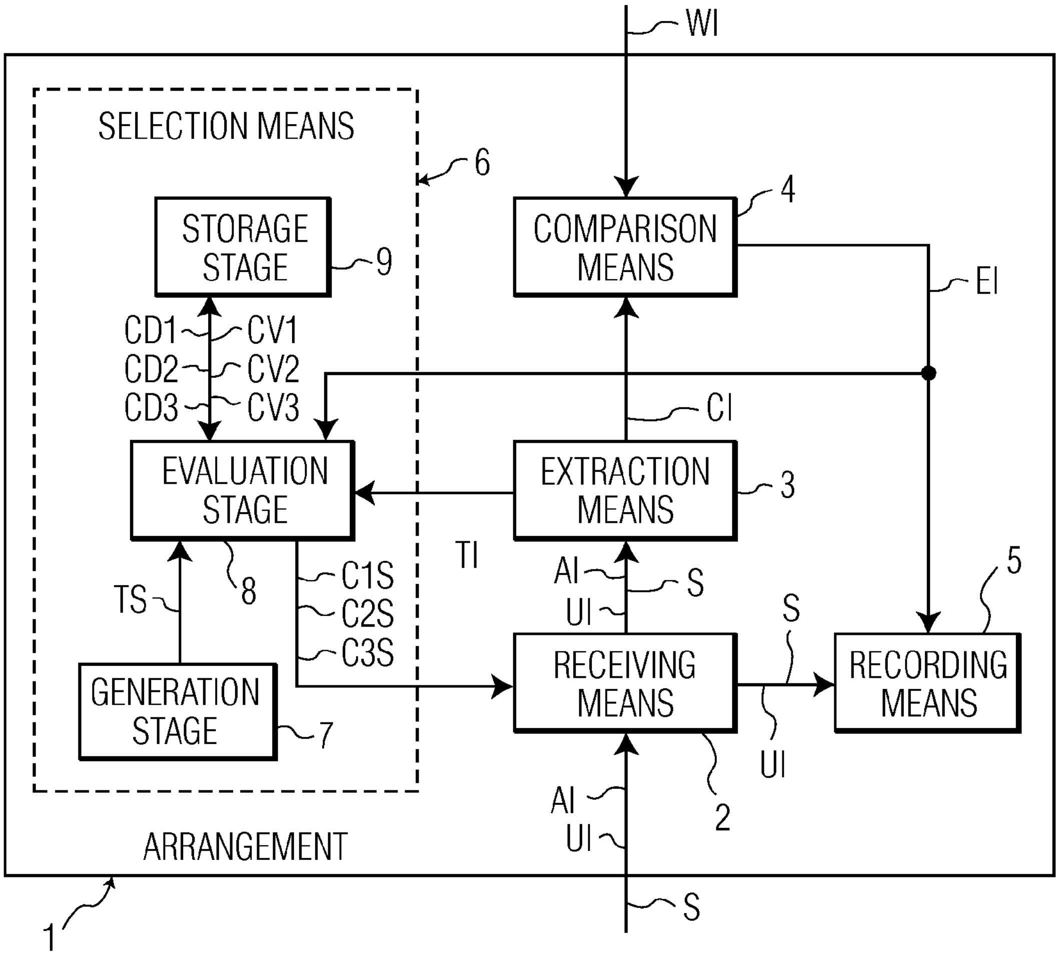
FIG. 1 shows schematically, in the form of a block diagram, an arrangement according to an example of an embodiment of the invention.
FIG. 2 shows, in the form of a table, a content of storage means of the arrangement according to FIG. 1.

FIG. 1 shows an arrangement 1 which forms an Internet radio and is designed to process a signal S. The signal S is formed by an Internet data stream which is sent out via the Internet by an Internet radio station on a channel allocated to the Internet radio station, so that the signal S can be received by a large number of arrangements 1 of this type at the same time if they are connected to the Internet and are tuned to the respective channel. The signal S has successive signal sections SP, wherein each signal section SP has a useful information item UI—specifically, for example, a piece of music—and an additional information item AI—specifically what are referred to as metadata. The metadata are provided for characterizing the individual signal sections SP with regard to their content and with regard to their time-dependent transmission status. The transmission status indicates a remaining residual duration of the respective signal section SP, so that a time-dependent occurrence of a final range EA of the respective signal section SP can be determined with the aid of the metadata of the respective signal section SP. The content of the useful information item UI of a piece of music, which indicates the genre, the name and/or the performer of the respective piece of music, is represented by a content information item CI contained in the additional information item AI of the respective piece of music.

Figure 4:
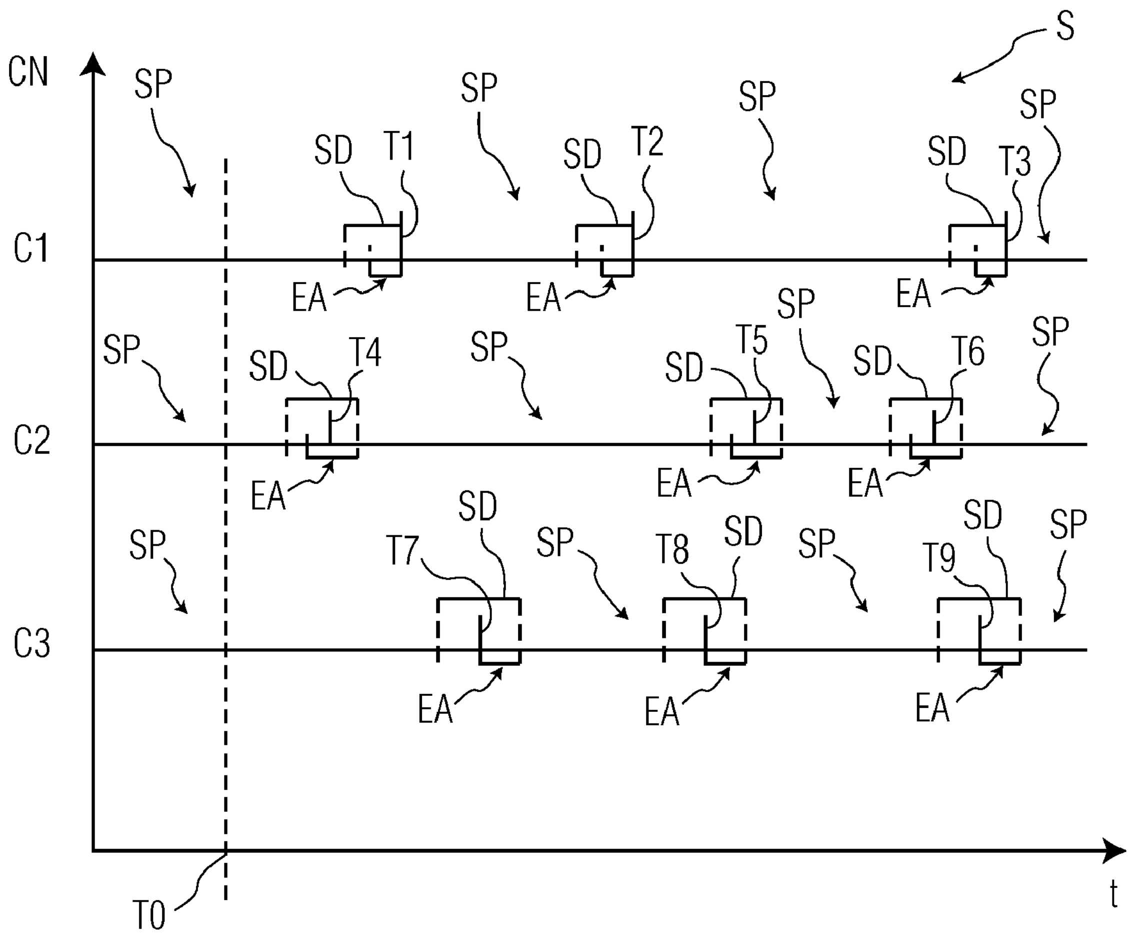
FIG. 4 shows, in the form of a diagram, a signal section sequence in three channels, with the aid of which the functioning of the arrangement according to FIG. 1 and the method according to the flowchart of FIG. 2 is explained.

FIG. 4 shows the signal S and the time-dependent occurrence of the signal sections SP in three channels C1 to C3 in the form of a diagram, wherein in the diagram the time t is plotted on the abscissa and the channels CN are plotted on the ordinate and wherein a new signal section SP begins in the respective channel C1, C2 or C3 in each case at instants T1 to T9. The individual signal sections SP can directly adjoin one another or be separated from one another in time by pauses or partially overlap one another, as is the case when the fading-out of a piece of music is started before one of the instants Ti and the fading-out is not ended until after the respective instant Ti. In the technical jargon this is also referred to as the fading-over between two pieces of music.

For the purpose of receiving the signal S, provided by one of the Internet radio stations, via the respective channel C1, C2 or C3, the arrangement 1 has receiving means 2 which are designed to receive three channel selection information items C1S, C2S and C3S, wherein the first channel C1 can be selected using the first channel selection information item C1S, the second channel C2 can be selected using the second channel selection information item C2S and the third channel C3 can be selected using the third channel selection information item C3S. The receiving means 2 are furthermore designed for the channel-selective reception of the signal S via the channel C1, C2 or C3 selected by the respective channel selection information item C1S, C2S or C3S, taking account of the channel selection information item C1S, C2S or C3S received or present in each case, and for delivering the received signal S.

The arrangement 1 furthermore has additional information item extraction means 3 which are designed to receive the signal S from the receiving means 2 and to extract the respective additional information item AI from the received signal S of the respectively selected channel C1, C2 or C3. The additional information item extraction means 3 are furthermore designed to deliver the respectively extracted additional information item AI in the form of the content information item CI and in the form of a time information item TI, which represent the remaining signal section duration of the respective signal section SP.

The arrangement 1 furthermore has comparison means 4 which are designed to receive a desired content information item WI that can be fed to the arrangement 1 by a user via a user interface not shown in FIG. 1, and to receive the content information item CI. The comparison means 4 are furthermore designed to compare the fed-in desired content information item WI with the content information item CI and to deliver a comparison information item EI which indicates the correspondence between the content information item and the desired content information item WI.

The arrangement 1 furthermore has recording means 5 which are designed to receive the comparison information item EI from the comparison means 4 and to receive the signal S from the receiving means 2. The recording means 5 are furthermore designed to record the signal S in the form of recording data when the comparison information item EI is received. This makes it possible for the arrangement 1 to be used for content-selective recording. It should be mentioned that the recording means 5 may of course also be designed to interact with the user interface and accordingly also to record on a user-controlled basis. Furthermore, it should be mentioned at this point that, in addition to the recording means 5 or instead of the recording means 5, playback means may be provided which may be designed for the content-selective playback of the received signal S in an acoustic or electrical manner.

The arrangement 1 furthermore has channel selection means 6 which are designed to receive the time information item TI and the comparison information item EI. The channel selection means 6 are furthermore designed to generate the three channel selection information items C1S, C2S and C3S for the selection of the three channels C1, C2 and C3 and to deliver the three channel selection information items C1S, C2S and C3S in temporal succession to the receiving means 2, so that the signal S can be received in temporal succession for the respectively selected channel C1 or C2 or C3 with the aid of the receiving means and so that the additional information item AI present in the respectively selected channel C1 or C2 or C3 can be extracted from the signal section SP with the aid of the additional information item extraction means 3, and the time information item TI that can be obtained therefrom can be delivered to the channel selection means 6. The channel selection means 6 are furthermore designed to receive the time information item TI that can in each case be extracted and delivered by the additional information item extraction means 3 in accordance with the respectively selected channel C1, C2 or C3 and, using the time information item TI received in each case in accordance with the respectively selected channel C1, C2 or C3, which time information item TI indicates the remaining residual duration of the respective signal section SP represented with the aid of the additional information item AI, to determine the time-dependent occurrence of the respective final range EA.

The channel selection means 6 are furthermore designed, following the determination of the time-dependent occurrence of the respective final ranges EA of the signal sections SP in the three channels C1, C2 and C3, to generate and deliver that channel selection information item C1S or C2S or C3S which can be used to select that channel C1 or C2 or C3 in which the signal section SP with the temporally next final range EA occurs. Specifically, the channel selection means 6 are designed to select this channel C1, C2 or C3 in such a manner that this channel C1, C2 or C3 can be selected within a selection time domain SD of five (5) seconds within which the time-dependent occurrence of the next final range EA is located, wherein the selection in the present case takes place such that the final range EA is located at the end of the selection time domain SD and such that the selection takes place at the start of the selection time domain SD, because adjacent signal sections SP overlap one another for a maximum of about five (5) seconds within the channels C2 and C3. This has the advantage that the user can perceive the newly beginning signal section SP as early as possible, at least acoustically, even when the additional information item of the preceding signal section SP is still available at this point in time. However, it should be mentioned that the final range of the respective signal section SP may also be located at the start of the selection time domain SD, although this is not explicitly illustrated in FIG. 4, and that the selection may take place at the end of the selection time domain. This has the advantage that the user is confronted with the acoustically perceptible content of the channel C1, C2 or C3 being respectively selected only once its additional information item AI is actually available. It should furthermore be mentioned that the final range EA may also be located around the middle of the selection domain SD and that the selection takes place in the middle of the selection domain SD. However, the provision of the selection domain SD, which extends beyond the final range EA or is larger than the final range, may also be advantageous when, following the selection, a certain period of time elapses before the signal S is actually received again, because first of all a new connection to the respective transmitting station has to be set up via the newly selected channel C1, C2 or C3 and it must be possible for this period of time to be taken into account by the selection time domain SD such that the selection is made at such an early point in time that, despite such delays, the start of the newly beginning signal section SP is reliably not missed. In this connection, it should also be mentioned that the receiving means 2 may be designed for the simultaneous reception of signals S via two channels during the selection time domain SD and that, although the selection of the new channel has already taken place, the signal for the newly selected channel C1, C2 or C3 is delivered by the receiving means 2 only when there is a reliable—that is to say stable—connection to the respective transmitting station on this channel. It should furthermore be mentioned that the channel selection means 6 may also be designed to adapt the period of time of the selection time domain SD as a function of whether a connection to the respective transmitting station is set up quickly or slowly, or whether a particularly slow or particularly fast fading-over between adjacent signal sections SP takes place within a channel C1, C2 or C3 which is to be newly selected. Provision may also be made for this adaptation to take place automatically by an analysis of the respective signal S or manually by the user. In this connection, a minimum selection time domain SD of one second is useful, because even the duration of the final range can rarely be indicated with an accuracy better than one second. However, it should be mentioned that, depending on the accuracy that is to be achieved in each case, a value less than one second may also be provided, for example 0.5 sec or 0.2 sec.

The channel selection means 6 are furthermore designed, after the comparison information item EI has been received, to retain the channel C1, C2 or C3 selected in accordance with the temporally next final range EA.

In order to implement the above-described function of the channel selection means 6, the channel selection means 6 have a time signal generation stage 7 and an information item evaluation stage 8 and a storage stage 9. The time signal generation stage 7 is designed for generating and for delivering a time signal TS at the information item evaluation stage 8, wherein, following the explanations regarding the accuracy of the final range, the time signal TS represents a seconds clock. The storage means 9 are provided for storing parameters CV1, CV2 and CV3, wherein the parameters CV1, CV2 and CV3 are significant for the time-dependent occurrence of the respective final range EA of the signal sections SP received via the selected channels C1, C2 and C3. The storage means 9 are furthermore provided for storing a channel data information item CD1, CD2 and CD3 which corresponds to the respective parameter CV1, CV2 and CV3. The information item evaluation stage 8 is designed to use the time signal TS to generate and to successively deliver the channel selection information items C1S, C2S and C3S and to receive the time information item TI corresponding to the respectively selected channel C1, C2 or C3. The information item evaluation stage 8 is furthermore designed to use the respective time information item TI to determine the respective parameter CV1, CV2 or CV3. The information item evaluation stage 8 is furthermore designed to deliver the parameters CV1 to CV3 and the channel data information items CD1 to CD3 to the storage means 9. The information item evaluation stage 8 is furthermore designed to evaluate the stored parameters CV1, CV2 or CV3 as soon as at least two of the three parameters CV1 to CV3 are available, in order to establish which channel is the one in which the signal section SP with the temporally next final range EA occurs. The information item evaluation stage 8 is furthermore designed to select, five (5) seconds before the temporally next final range EA occurs, said determined channel C1, C2 or C3 and to remain in this channel C1, C2 or C3 if the comparison information item EI is received for this selected channel C1, C2 or C3.

Hereinbelow, the mode of operation of the arrangement 1 will now be explained with reference to an application example of the arrangement 1 according to FIG. 1. According to this application example, it is assumed that a user enters a desired content information item WI in the arrangement 1 at the instant T0 plotted in FIG. 4, said desired content information item WI indicating the piece of music "Like a Virgin" which is sung by the artist "Madonna". It is furthermore assumed that this piece of music is available between the instants T7 and T8 in the third channel C3, although the user of the arrangement 1 is not yet aware of this at the instant T0. It is furthermore assumed that at the instant T0 the third channel C3 is received at the receiving means 2.

Figure 3:
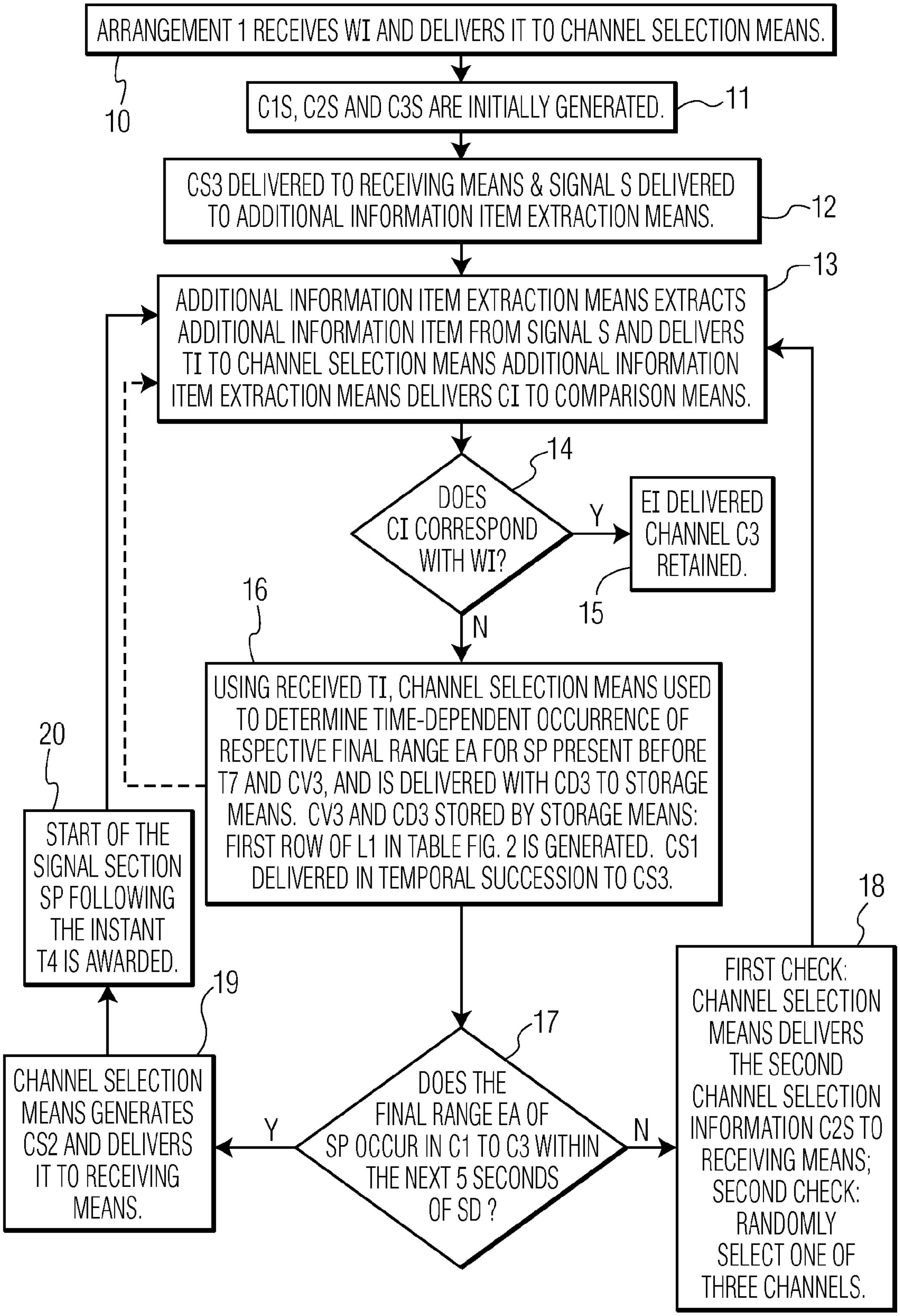
FIG. 3 shows a flowchart relating to a channel selection method according to an example of an embodiment of the invention.

In order for it to be possible for this desired piece of music to be found without any intervention by the user, the arrangement 1 is designed to carry out a channel selection method in order to select one of the channels C1, C2 or C3. The method is illustrated with the aid of a flowchart shown in FIG. 3.

The method starts at a block 10, in which the arrangement 1 receives the desired content information item WI input by the user and delivers it to the channel selection means 6.

Thereafter, at a block 11, the three channel selection information items C1S, C2S and C3S are initially generated.

Subsequently, the three channel selection information items C1S, C2S and C3S are delivered in temporal succession to the receiving means 2, wherein firstly, at a block 12, the third channel selection information item C3S is delivered to the receiving means 2. At the block 12, the receiving means 2 are furthermore used for the channel-selective reception of the signal S via the third selected channel C3, taking account of the channel selection information item C3S fed to them, and for delivering the signal S to the additional information item extraction means 3.

At a block 13, the additional information item extraction means 3 are used to extract the additional information item from the received signal S and to deliver the time information item TI to the channel selection means 6 which receives the time information item TI. At the same time, the additional information item extraction means 3 are used to deliver the content information item CI to the comparison means 4, and said content information item CI is compared with the desired content information item WI at a block 14.

In the case where the comparison at the block 14 shows that the content information item CI corresponds to the desired content information item WI, the comparison means 4 are used to generate the comparison information item EI which indicates that the content information item CI corresponds to the desired content information item WI. Thereafter, the comparison information item EI is delivered to the channel selection means 6 and the method ends at a block 15, wherein the channel C3 selected at that moment in time would be retained.

Since, however, shortly after the instant T0 in the present case there is still no correspondence between the desired content information item WI and the content information item CI, the method branches to a block 16, in which, using the received time information item TI, the channel selection means 6 are used to determine the time-dependent occurrence of the respective final range EA for the signal section SP present essentially before the instant T7, and the parameter CV3 corresponding thereto is delivered along with the channel data information item CD3 to the storage means 9. The parameter CV3 and the channel data information item CD3 are stored using the storage means 9, wherein a first row L1 in the table shown in FIG. 2 is generated. Furthermore, in accordance with the method, at the block 16 after the first row L1 in the table has been generated, a channel selection information item which is different from the previously delivered channel selection information item CS3—in the present case CS1—is generated at will in temporal succession to the delivery of the third channel selection information item CS3, and the method continues at the block 13. However, since this branching only takes place at the start of the channel selection method after the fist row L1 in the table has been generated, the connection between the block 16 and the block 13 is illustrated in dashed line.

At the block 13, the time information item TI extracted and contained in the signal section SP present before the instant T1 in accordance with the first selected channel C1 is received by the channel selection means 6 and, at the block 14, the correspondence between the content information item CI and the desired content information item WI is checked. Since again in the present case there is no correspondence for the channel C1, at the block 16 a second row L2 in the table is generated and the parameter CV1 and the channel data information item CD1 are noted.

In accordance with the method, following the determination of the time-dependent occurrence of the respective final range EA of the respective signal section SP in the third channel C3 and in the first channel C1, the method branches to a block 17, in which a check is made as to whether a temporally next final range EA for the respective signal section SP will occur on one of the two channels C1 or C3 within the next five (5) seconds of the selection time domain SD.

If this is not the case, as in the present case, then the method branches to a block 18, in which the channel selection means 6 deliver the second channel selection information item C2S to the receiving means 2. Thereafter, the method branches to the block 13, and the time information item TI, delivered by the additional information item extraction means 3, for the signal section SP present essentially before the instant T4 is received by the channel selection means 6. At the block 14, the content information item CI for the currently present signal section SP of the second channel C2 is checked to see whether it corresponds to the desired content information item WI, and again in the present case the method branches to the block 16 as there is no correspondence.

At the block 17, a check is again made, using the table, to see whether the final range EA of one of the signal sections SP will occur in one of the three channels C1 to C3 within the next five (5) seconds. If this is not the case, the method branches to the block 18, and one of the three channels is selected by random selection.

Thereafter, the channel selection method according to the blocks 13, 14, 16, 17 and 18 will continue until, at the block 17, an occurrence of a final range EA is detected within the selection time domain SD.

This situation is firstly seen in the region of the instant T4, so that at the block 17 the method branches to a block 19. Since the signal section SP in which the temporally next final range EA occurs is present in the second channel C2, in accordance with the method, at the block 19, the channel selection means are then used to generate the channel selection information item CS2 and deliver it to the receiving means. Thereafter, at a block 20, at least the start of the signal section SP following the instant T4 is awaited, and the method branches to the block 13 only once the additional information item for this newly beginning signal section SP is available.

However, since there is also no correspondence between the desired content information item WI and the content information item CI for this signal section SP, the table is only amended in that the parameter CV2 represents the final range EA of the signal section SP following the instant T4, after which that part of the method comprising the blocks 13, 14, 16, 17 and 18 is again continued until the final range EA of the signal section SP present before the instant T1 in the first channel occurs within the selection time domain SD, after which, at the block 17, the method branches via the blocks 19 and 20 to the block 13, and subsequently, for the signal section SP occurring after the instant T1, the content information item CI is checked for correspondence with the desired content information item WI, wherein again for this signal section SP in the present case no correspondence can be found.

In accordance with the prerequisite for this application example, such a correspondence only occurs for the signal section SP, occurring after the instant T7, in the third channel C3, which is selected after proceeding through the blocks 13, 14, 16, 17 and 18 a number of times and finally branching to the blocks 19 and 20. The method then ends at the block 15.

Accordingly, in the arrangement according to the invention, the advantage is obtained that, although on a large number of channels C1, C2 or C3 there is no content information item CI extending beyond the content available at a given moment in time, nevertheless, without any intervention by the user, firstly the new beginning of a piece of music on one of the channels C1, C2 and C3 can practically not be missed and secondly that channel C1, C2 or C3 on which the piece of music which corresponds to the desired content information item WI specified by the user is present can be permanently selected in an automatic manner.

It should be mentioned that the arrangement 1 can also be designed for processing a signal S in which the useful information item UI of the signal sections SP represents a video film. In this case, the content information item CI can also contain or represent the name of a director or of a producer or other details relating to the video film.

It should be mentioned that exclusive mention has been made above of three channels, but the person skilled in the art will of course understand that practically any desired number of channels can be treated with the aid of the arrangement 1 according to the invention or with the aid of the channel selection method according to the invention.

It should furthermore be mentioned that for example also a selection time domain SD of twenty (20) seconds may be provided, although this is relatively long for a piece of music in relation to its overall duration and may therefore preferably be used in the case of a video film.

It should furthermore be mentioned that the channel selection method according to which the method ends at the block 15 and the respective piece of music has been played back in full is started again automatically. In this connection, provision may also be made for a number of desired content information items WI to be input and for the various desired content information items WI to be dealt with in succession.

The invention claimed is:

1. An arrangement (1) for processing a signal (S) which has successive signal sections (SP), wherein each signal section (SP) comprises a useful information item (UI) and an additional information item (AI) and wherein a time-dependent occurrence of a final range (EA) of a signal section (SP) can be determined with the aid of the additional information item (AI) of this signal section (SP), which arrangement (1) has receiving means (2) which are designed for the channel-selective reception of the signal (S) via the respectively selected channel (C1, C2, C3), taking account of a channel selection information item (C1S, C2S, C3S) which can be fed to it, and for the delivery of the received signal (S), and which arrangement (1) has additional information item extraction means (3) which are designed to extract the respective additional information item (AI) from the received signal (S) of the respectively selected channel (C1, C2, C3) and to deliver the respectively extracted additional information item (AI), and which arrangement (1) has channel selection means (6) which are designed a) to generate at least two channel selection information items (C1S, C2S, C3S) for the selection of at least two channels (C1, C2, C3), and b) to temporally successively deliver the at least two channel selection information items (C1S, C2S, C3S) to the receiving means (2), and c) to receive the additional information item (AI) respectively extracted and delivered by means of the additional information item extraction means (3) in accordance with the respectively selected channel (C1, C2, C3), and d) using the additional information item (AI) respectively received in accordance with the respectively selected channel (C1, C2, C3), to determine the time-dependent occurrence of the respective final range (EA), and e) following the determination of the time-dependent occurrence of the respective final ranges of the signal sections (SP) in at least two channels (C1, C2, C3), to generate and deliver that channel selection information item (C1S, C2S, C3S) which can be used to select that channel (C1, C2, C3) in which the signal section (SP) with the temporally next final range (EA) occurs.

2. An arrangement (1) as claimed in claim 1, wherein the channel selection means (6) are designed to select, within a selection time domain (SD) in which the time-dependent occurrence of the temporally next final range (EA) is located, the channel (C1, C2, C3) in which the signal section (SP) with the temporally next final range (EA) occurs, and wherein the selection time domain (SD) has a duration of between twenty seconds and one second.

3. An arrangement (1) as claimed in claim 1, wherein the channel selection means (6) are designed to use the additional information item representing a remaining residual duration of the respective signal section (SP) to determine the time-dependent occurrence of the final range (EA) of the respective signal section (SP).

4. An arrangement (1) as claimed in claim 1, wherein storage means (9), which interact with the channel selection means (6), are provided for storing parameters (CV1, CV2, CV3), wherein the parameters (CV1, CV2, CV3) are significant for the time-dependent occurrence of the respective final range (EA) of the signal sections (SP) received via each selected channel (C1, C2, C3).

5. An arrangement (1) as claimed in claim 4, wherein the storage means (9) are provided for storing a channel data information item (CD1, CD2, CD3) which corresponds to the respective parameter (CV1, CV2, CV3), which channel data information item (CD1, CD2, CD3) is provided for indicating the respective channel (C1, C2, C3).

6. An arrangement (1) as claimed in claim 1, wherein comparison means (4) are provided, which comparison means are designed to compare a desired content information item (WI) that can be fed to the arrangement (1) with a content information item (CI) that is contained in the additional information item (AI) of a signal section (SP) and that represents the content of the useful information item (UI) in the signal section (SP), and which comparison means are designed to deliver a comparison information item (EI) to the channel selection means (6), said comparison information item (EI) indicating the correspondence between the content information item (CI) and the desired content information item (WI), and wherein the channel selection means (6) are designed, after the comparison information item (EI) has been received, to retain the channel (C1, C2, C3) selected in accordance with the temporally next final range (EA).

7. A channel selection method for selecting a channel (C1, C2, C3), via which channel (C1, C2, C3) a signal which has successive signal sections (SP) can be received, wherein each signal section (SP) comprises a useful information item (UI) and an additional information item (AI) and wherein a time-dependent occurrence of a final range (EA) of a signal section (SP) can be determined with the aid of the additional information item (AI) of this signal section (SP), wherein the signal (S) is received in a channel-selective manner via the respectively selected channel (C1, C2, C3) with the aid of receiving means (2), taking account of a channel selection information item (C1S, C2S, C3S) which can be fed to them, and the received signal (S) is delivered by the receiving means (2), and wherein the additional information item (AI) is extracted from the received signal (S) of the respectively selected channel (C1, C2, C3) with the aid of additional information item extraction means (3) and is delivered by the additional information item extraction means (3), and wherein channel selection means (6) are used a) to generate at least two channel selection information items (C1S, C2S, C3S) for the selection of at least two channels (C1, C2, C3), and b) to temporally successively deliver the at least two channel selection information items (C1S, C2S, C3S) to the receiving means (2), and c) to receive the additional information item (AI) respectively extracted and delivered by means of the additional information item extraction means (3) in accordance with the respectively selected channel (C1, C2, C3), and d) using the additional information item (AI) respectively received in accordance with the respectively selected channel (C1, C2, C3), to determine the time-dependent occurrence of the respective final range (EA), and e) following the determination of the time-dependent occurrence of the respective final ranges (EA) of the signal sections (SP) in at least two channels (C1, C2, C3), to generate and deliver that channel selection information item (C1S, C2S, C3S) which can be used to select that channel (C1, C2, C3) in which the signal section (SP) with the temporally next final range (EA) occurs.

8. A channel selection method as claimed in claim 7, wherein the channel selection means (6) are used to select, within a selection time domain (SD) in which the time-dependent occurrence of the temporally next final range (EA) is located, the channel (C1, C2, C3) in which the signal section (SP) with the temporally next final range (EA) occurs.

9. A channel selection method as claimed in claim 7, wherein, using the additional information item (AI) representing a remaining residual duration of the respective signal section (SP), the time-dependent occurrence of the final range (EA) of the respective signal section (SP) is determined with the aid of the channel selection means (6).

10. A channel selection method as claimed in claim 7, wherein storage means (9), which interact with the channel selection means (6), are used to store parameters (CV1, CV2, CV3), which parameters (CV1, CV2, CV3) are significant for the time-dependent occurrence of the respective final range (EA) of the signal sections (SP) received via each channel (C1, C2, C3).

11. A channel selection method as claimed in claim 10, wherein the storage means (9) are used to store a channel data information item (CD1, CD2, CD3) which corresponds to the respective parameter (CV1, CV2, CV3), which channel data information item (CD1, CD2, CD3) is provided for indicating the respective channel (C1, C2, C3).

12. A channel selection method as claimed in claim 7, wherein comparison means (4) are used to compare a desired content information item (WI) that can be fed to the arrangement (1) with a content information item (CI) that is contained in the additional information item (AI) in the signal section (SP) and that represents the content of the useful information item (UI) in the signal section (SP), and to deliver a comparison information item (EI) to the channel selection means (6), said comparison information item indicating the correspondence between the content information item (CI) and the desired content information item (WI), and wherein the channel selection means (6) are used, after the comparison information item (EI) has been received, to retain the channel (C1, C2, C3) selected in accordance with the temporally next final range (EA).

* * * * *